United States Patent

Wen et al.

[11] Patent Number: 5,858,538
[45] Date of Patent: Jan. 12, 1999

[54] COMPOSITE LUMINESCENT MATERIAL

[75] Inventors: Ching-ju Wen, Tokyo; Nobutsugu Minami, Tsukuba, both of Japan

[73] Assignee: Director-General of Agency of Industrial Science & Technology, Japan

[21] Appl. No.: 772,914

[22] Filed: Dec. 24, 1996

[30] Foreign Application Priority Data

Jan. 8, 1996 [JP] Japan .................................. 8-000990

[51] Int. Cl.$^6$ ...................................... I09K 11/00
[52] U.S. Cl. ........................ 428/408; 428/216; 428/457
[58] Field of Search ................... 428/408, 457, 428/701, 702, 216, 426

[56] References Cited

U.S. PATENT DOCUMENTS

| | | | |
|---|---|---|---|
| 5,172,278 | 12/1992 | Tutt | 359/885 |
| 5,331,183 | 7/1994 | Sariciftci et al. | 257/40 |
| 5,453,413 | 9/1995 | Eklund | 423/445 B |
| 5,494,558 | 2/1996 | Bunshah et al. | 204/192.15 |
| 5,589,281 | 12/1996 | Okuda et al. | 428/408 |
| 5,635,455 | 6/1997 | Okuda et al. | 505/460 |

*Primary Examiner*—Archene Turner
*Attorney, Agent, or Firm*—Lorusso & Loud

[57] ABSTRACT

A composite material having at least one fullerene layer and at least one layer of an auxiliary substance provided on the fullerene layer and selected from metals metalloids, metal compounds, metalloid compounds and mixtures thereof. The auxiliary substance layer is formed by sputtering. The composite material emits strong luminescence when irradiated with an argon laser.

9 Claims, No Drawings

COMPOSITE LUMINESCENT MATERIAL

BACKGROUND OF THE INVENTION

This invention relates to a composite luminescent material and, more specifically, to a composite photoluminescent material having a fullerene layer and the capabilty of luminescing upon being irradiated with argon laser. The present invention is also directed to a method of preparing such a composite luminescent material.

Fullerenes are hollow molecules containing 32 to 960 carbon atoms and may be produced by, for example, a method disclosed in Nature, 347, 354 (1990) by Kratschmer et al. Among fullerenes, it is known that $C_{60}$ and $C_{70}$ are stable. It is also known that $C_{60}$ emits luminescence. However, the luminescence of $C_{60}$ is very weak.

SUMMARY OF THE INVENTION

It has now been found that a fullerene layer composited with an auxiliary substance layer can produce strong photoluminescence when irradiated with an argon laser beam.

In accordance with the present invention there is provided a composite material comprising at least one fullerene layer and at least one layer of an auxiliary substance provided on said fullerene layer, said auxiliary substance being selected from the group consisting of metals metalloids, metal compounds, metalloid compounds and mixtures thereof.

The present invention also provides a method of producing a composite luminescent material, comprising forming a fullerene layer, and sputtering an auxiliary substance selected from metals, metalloids, metal compounds and metalloid compounds on said fullerene layer to form a layer of said auxiliary substance.

It is the prime object of the present invention to provide a composite material which contains a fullerene layer and which emits strong luminescence when irradiated with an argon laser.

Other objects, features and advantages of the present invention will become apparent from the detailed description of the preferred embodiments of the invention to follow.

DETAILED DESCRIPTION OF THE PREFERRED EMBODIMENTS OF THE INVENTION

The composite material according to the present invention includes at least one fullerene layer and at least one layer of an auxiliary substance provided on the fullerene layer. The auxiliary substance is selected from metals, metal compounds, metalloids and metalloid compounds.

The fullerene is preferably $C_{60}$ for reasons of stability. The fullerene layer may be formed by a vacuum deposition technique using a suitable substrate such as a glass, quartz, a metal, a plastic or a ceramic.

Any metal, metal compound, metalloid, or metalloid compound can be used as the auxiliary substance as long as it can be formed into a layer by a sputtering technique. Thus, the metals and metalloids are elements belonging to Groups Ia, IIa, IIIa, IVa, Va, VIa, VIIa, VIII, Ib, IIb, IIIb, IVb, Vb and VIb of the Periodic Table. Mixtures and alloys of the metals and metalloids may also be suitably used. Compounds of metals or metalloids may be, for example, oxides, sulfides and nitrides. Illustrative of suitable auxiliary substances are silicon, germanium, tin oxide, titanium oxide, indium oxide, silicon oxide, aluminum oxide, zinc oxide, silicon nitride, boron nitride, cadmium sulfide, zinc sulfide and glass.

The total thickness of the fullerene layer or layers is preferably 500 nm to 500 $\mu$m and the total thickness of the metal or metal compound layer or layers is preferably 10 nm to 100 $\mu$m. The auxiliary substance is generally present in an amount of 0.5–10% by weight based on the total weight of the auxiliary substance and the fullerene.

When two or more fullerene layers and two or more auxiliary substance layers are used, they are preferably alternately arranged. In this case, each of the fullerene layers has a thickness in the range of 10 nm to 5 $\mu$m and each of the layers of an auxiliary substance has a thickness in the range of 0.5 nm to 1 $\mu$m.

The composite material according to the present invention emits luminescence having wave lengths of 650 nm or more when irradiated with an argon laser (wave length: 514.5 nm). The intensity of luminescence may vary depending upon the relative thickness of the fullerene and auxiliary substance layers, the type of auxiliary substance, etc. The intensity, at a wave length of 750 nm, of the luminescence is preferably at least twice as strong as that generated from a sole fullerene layer having no auxiliary substance layer. Because of its strong photoluminescence, the composite material of the present invention may be suitably used as, for example, a light source in visible and infra red spectrometers.

The following examples will further illustrate the present invention.

EXAMPLE 1

Layers of $C_{60}$ and layers of silicon were alternately superimposed on a 0.5 mm thick glass plate. The $C_{60}$ layers were formed by vacuum deposition while the silicon layers were formed by sputtering. A common vacuum chamber was used for the vacuum deposition and the sputtering. Argon was fed to the vacuum chamber at $10^{-6}$ Torr so that the inside pressure of the vacuum chamber was adjusted to $4\times10^{-3}$ Torr. The vacuum deposition was performed by placing a crucible containing powder of $C_{60}$ in the vacuum chamber and heating the crucible at 300° C. so that $C_{60}$ sublimed and deposited on the glass plate. The sputtering was performed by producing argon ion by applying a high frequency wave (13.6 MHz) at 50 W and bombarding a Si target with the argon ion to eject Si clusters therefrom. The vacuum deposition and the sputtering were alternately carried out 100 times to obtain a composite material. The thickness of each of the $C_{60}$ layers was about 30 nm, while the thickness of each of the silicon layers was about 0.6 nm. When the composite material was irradiated with an argon laser beam (intensity on the surface of the composite material was 1.88 W/cm$^2$), luminescence (white light) was found to be emitted from the composite material. The luminescence had an intensity increasing with an increase of the wavelength. The ratio of the intensity of the luminescence from the composite material to that from a $C_{60}$ film (having no silicon layers) was 5:1 at a wave length of 700 nm, 4:1 at a wave length of 750 nm and 50:1 at a wave length of 900 nm.

EXAMPLE 2

On a glass plate having a thickness of 0.5 mm, a $C_{60}$ layer having a thickness of about 2000 nm was formed by vacuum deposition in the same manner as that in Example 1. Then, a silicon layer having a thickness of about 10 nm was formed by sputtering on the $C_{60}$ layer in the same manner as that in Example 1 to obtain a composite material. The composite material was found to emit stronger luminescence than that from a $C_{60}$ film without a silicon layer.

EXAMPLE 3

Example 1 was repeated in the same manner as described except that a titanium oxide target was substituted for the silicon target, thereby obtaining a composite material having alternately arranged $C_{60}$ layers and titanium oxide layers. The composite material was found to emit stronger luminescence than that from a $C_{60}$ film without a silicon layer.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A composite material at least two fullerene layers and at least two layers of an auxiliary substance alternately arranged with said fullerene layers, said auxiliary substance being selected from the group consisting of metals, metalloids, metal compounds, metalloid compounds and mixtures thereof.

2. A composite material as claimed in claim 1, wherein said layers of an auxiliary substance are formed on said fullerene layers by sputtering.

3. A composite material as claimed in claim 1, wherein said auxiliary substance is selected from silicon, germanium, tin oxide, titanium oxide, indium oxide, silicon oxide, aluminum oxide, zinc oxide, silicon nitride, boron nitride, cadmium sulfide, zinc sulfide and glass.

4. A composite material as claimed in claim 1, wherein said fullerene consists essentially of $C_{60}$.

5. A composite material as claimed in claim 1, wherein said auxiliary substance is present in an amount of 0.5–6% by weight based on the total weight of said auxiliary substance and said fullerene.

6. A composite material as claimed in claim 1, wherein the total thickness of said at least two fullerene layers is 500 nm to 500 µm and the total thickness of said at least two layers of an auxiliary substance is 10 nm to 100 µm.

7. A composite material as claimed in claim 1, wherein each of said fullerene layers has a thickness in the range of 10 nm to 5 µm and each of said layers of an auxiliary substance has a thickness in the range of 0.5 nm to 1 µm.

8. A composite material as claimed in claim 1, further comprising a substrate on which said at least two fullerene layers and at least two layers of an auxiliary substance are supported.

9. A composite material as claimed in claim 1, generating, upon being irradiated with argon laser, luminescence having, at a wave length of 750 nm, at least twice as high an intensity as that generated from a fullerene layer without layers of said auxiliary substance.

* * * * *

UNITED STATES PATENT AND TRADEMARK OFFICE
CERTIFICATE OF CORRECTION

PATENT NO. : 5,858,538
DATED : January 12, 1999
INVENTOR(S) : WEN et al

It is certified that error appears in the above-indentified patent and that said Letters Patent is hereby corrected as shown below:

Col. 3, line 19, after "material" insert --comprising--.

Signed and Sealed this

Fourteenth Day of December, 1999

Attest:

Q. TODD DICKINSON

Attesting Officer

Acting Commissioner of Patents and Trademarks